United States Patent Office 3,213,151
Patented Oct. 19, 1965

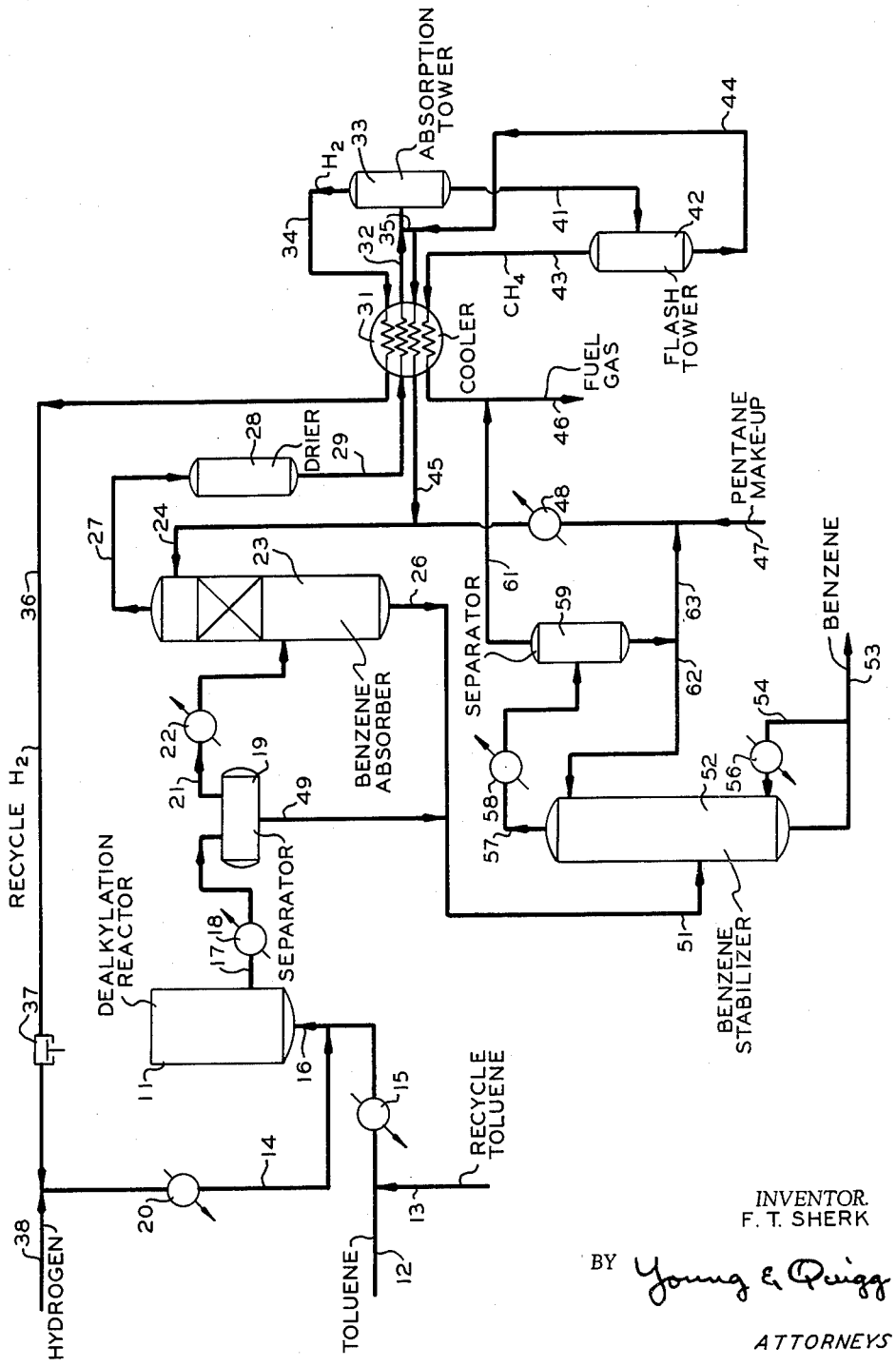

3,213,151
RECOVERY OF HYDROGEN FROM GASEOUS
MIXTURES AND IMPROVED HYDROGENA-
TION PROCESS
Fred T. Sherk, Bartlesville, Okla., assignor to Phillips
Petroleum Company, a corporation of Delaware
Filed July 27, 1962, Ser. No. 212,952
6 Claims. (Cl. 260—667)

This invention relates to a process for the recovery of hydrogen from gaseous mixtures of the same and methane. In another aspect, it relates to an improved hydrogenation process, wherein hydrogen is recovered from a gaseous mixture produced by the process for reuse therein.

In a number of industrial processes, particularly in the case of hydrodealkylation of toluene to benzene, it often becomes necessary for economic reasons to separate and recover hydrogen from the gaseous mixtures containing the same, methane and hydrogenated hydrocarbon product (e.g., benzene). Such gaseous mixtures are generally of great volume and because of this it is quite expensive to handle such mixture and separate and recover the valuable hydrogen component. I have now discovered an improved process whereby hydrogen can be separated and recovered from such gaseous mixtures in an economical manner. When this improved hydrogen separation and recovery operation is carried out in conjunction with a hydrogenation process, such as the above-mentioned hydrodealkylation of toluene, the overall economics of such hydrogenation process are improved.

According to the invention, a gaseous mixture comprising hydrogen, methane and a normally liquid hydrogenated hydrocarbon product, such as benzene or cyclohexane, is scrubbed in an isothermal absorption zone operated at superatmospheric pressures with a low molecular weight, normally liquid, paraffinic hydrocarbon absorbent, such as pentane, to absorb the hydrogenated product. Absorbents which can be used will be those having 3 to 6 carbon atoms per molecule, such as propane, butane, pentane, and hexane. The scrubbed gases are then subjected to two one-stage or multi-stage refrigerated liquid-vapor separation steps at progressively lower superatmospheric pressures to separate first the hydrogen component and then the methane component, the separated gas streams containing these components being employed as indirect heat exchange refrigerating media in said refrigerated liquid-vapor separation steps. Any of said absorbent which is also separated by the refrigerated sepaartion steps can also be employed as said heat exchange refrigeration media and thereafter recycled to said absorption step along with any further adsorbent obtained by stabilization of the rich adsorbent. The recovered hydrogen can be recycled for use in the hydrogenation process and the recovered methane-containing gaseous stream used as fuel gas. The recovery of hydrogen in this manner from such gaseous mixtures minimizes the use of external heat input or refrigeration, lessens the expense of pumping large volumes of adsorbent, and requires a moderate investment in equipment.

Further objects and advantages of this invention will become apparent to those skilled in the art from the following discussion, appended claims and accompanying drawing in which the single figure illustrates the flow sheet of an improved hydrogenation process of this invention with features of the novel hydrogen separation and recovery of this invention associated therewith.

Referring now to the drawing, a hydrodealkylation reactor is shown and generally designated 11, in which reactor an exothermic hydrogenation reaction is carried out. The hydrodealkylation can be carried out in the presence of powdered inert material or catalyst, or can be carried out in the absence of such materials. Reactor 11 is preferably a thermal hydrodealkylation reactor of the tubular type lined with gunnite or the like and provided with ceramic pipe internals and is operated at superatmospheric pressures, such as 400 to 1,000 p.s.i.a., typically about 600 p.s.i.a. Makeup toluene supplied by line 12 and recycled toluene supplied by line 13 are heated by heat exchanger 15 and mixed with heated hydrogen supplied by line 14 and the mixture supplied via reactor feed line 16 to reactor 11, the hydrogen-to-hydrocarbon mol ratio, for example, being from 2/1 to 20/1. If reactor 11, the toluene is dealkylated (or demethylated) by an exothermic reaction to produce benzene and methane, the conversion being substantially quantitative, e.g., 85 percent and higher. The reactor effluent comprising hydrogen, methane and hydrogenated product (viz., benzene) can be cooled, for example, by heat exchanger 18 from about 1300–1500° F., typically about 1400° F., to about 800–1100° F., typically about 1,000° F. This reactor effluent can be used in whole or part, if desired, as heat exchange medium for heat exchanger 15 to heat the toluene feed and for heat exchanger 20 to heat the hydrogen. The reactor effluent in line 17 can be passed to a separator 19 where the liquid phase comprising benzene is separated from the gaseous phase comprising hydrogen, methane, and some benzene.

The gaseous phase withdrawn from separator 19 by line 21 is cooled, for example by heat exchanger 22 to 40 to 120° F., typically about 50° F., and 300 to 600 p.s.i.a., and introduced into an absorption tower 23, which can be provided with the usual liquid-vapor contact trays, packing, etc. Pentane is supplied via line 24 to the top of absorption tower 23. The pentane flows downwardly countercurrent to the upward flowing gaseous mixture within absorption tower 23, thereby dissolving or absorbing substantial quantities of the benzene component from the gaseous phase. This absorption operation is carried out at atmospheric temperatures and at superatmospheric pressure, e.g. 35–120° F. and 300–600 p.s.i.a. The benzene-pentane liquid mixture is withdrawn from the bottom of absorption tower 23 via line 26 and passed to subsequent operation, to be described hereinafter.

The scrubbed gaseous mixture withdrawn overhead via line 27 from absorption tower 23, and comprising hydrogen, methane and some pentane, is passed through a dryer 28 at the same temperatures and pressures as tower 23. The dried gaseous mixture from dryer 28 is passed via line 29 to a cooling unit 31, where the gaseous mixture is cooled to lower temperatures at superatmospheric pressures. If desired, cooling unit 31 can include an external refrigerant. This cooled stream is then passed via line 32 and mixed with cold pentane supplied via line 35, and the mixture at −30 to −100° F. is passed to a liquid-vapor separation zone, such as absorption tower 33, operated at superatmospheric pressures, e.g., 300 to 600 p.s.i.a., wherein the hydrogen component is withdrawn overhead via line 34. In the event that absorption tower 33 is a multi-stage unit, the pentane stream 35 can instead be passed into the top of such a unit. The separated hydrogen stream 34 is then passed through cooler 31 and thence returned to the process as recycled hydrogen via line 36. The recycled hydrogen at 250 to 550 p.s.i.a. in line 36 can be compressed by compressor 37 to 400–1000 p.s.i.a. and combined with makeup hydrogen supplied via line 38, the mixed hydrogen stream then being heated by heat exchanger 20 to 500–1000° F. and passed via line 14 for admixture with the toluene.

The liquid in absorption tower 33, comprising condensed methane and pentane, is removed via line 41 and passed to a second liquid-vapor separation zone, such as flash tower 42, which is operated at about the same subzero temperatures as absorption tower 33, e.g., −30 to −100° F., but at a relatively lower superatmospheric pressure, for example 20 to 150 p.s.i.a. A partial vaporization of the liquid mixture is effected, the methane component being withdrawn overhead via line 43 from flash tower 42 and the liquid product comprising pentane being withdrawn from the bottom of flash tower 42 via line 44. The methane-containing gaseous stream 43 is passed through cooler 31 and thence via line 46 to disposal, for example, as fuel gas. Most of the recovered pentane, in stream 44, is passed directly into line 32 via line 35 and the balance is passed through cooler 31 and thence via line 45 and returned to the benzene absorption tower 23. Makeup pentane can be supplied via line 47, cooled by heat exchanger 48, mixed with the recycle pentane, and passed to absorption tower 23 via line 24.

The pentane-benzene liquid withdrawn via line 26 from benzene absorption tower 23 is combined with the liquid withdrawn from separator 18 via line 49 and passed via line 51 to a benzene stabilizer 52. Stabilized liquid benzene product is withdrawn from stabilizer 52 via line 53, some of it being returned via line 54 to the kettle of stabilizer 52 after being heated by heat exchanger 56. Overhead from stabilizer 52, comprising pentane, methane, and very little benzene, is withdrawn via line 57, cooled by cooler 58, and passed to a liquid-vapor separator 59. The gas withdrawn via line 61 from separator 59, comprising methane, is passed to line 46 and disposal as fuel gas. Liquid from separator 59, comprising pentane, is divided and returned in part via line 62 as reflux to stabilizer 52 and is recycled in part via line 63 to the benzene absorption tower 23.

Although I have described and illustrated my invention using toluene as the initial hydrocarbon feed, my invention is applicable in the generic sense to any hydrogenation process wherein an unsaturated hydrocarbon feed, such as benzene, is converted to a more saturated hydrocarbon, such as cyclohexane, in the presence of hydrogen, preferably an excess thereof, and in which methane is yielded. I prefer to employ the hydrogen separation and recovery features of this invention in conjunction with hydrodealkylation processes, for conversion of alkylbenzenes (used herein generically to cover mono-alkyl benzenes and poly-alkyl benzenes) because such hydrodealkylation processes produce great quantities of methane, and the instant invention is especially adapted to handle the same. Representative alkylbenzenes which can be used as feeds includes toluene, xylene, ethylbenzene, diethylbenzene, cumene, propylbenzene, isopropylbenzene, diisopropylbenzene, butylbenzene, amylbenzene, mesitylene, methyl-ethylbenzene, pseudocumene, hemimellitene, prehnitrene, durene, and the like, including mixtures of hydrocarbons containing one or more of these compounds.

The methylbenzene hydrocarbons, such as toluene and xylene are preferred, since higher alkylbenzenes will tend in some cases to produce undesirable products.

This dealkylation can be of the non-catalytic type, i.e., thermal hydrodealkylation, or catalytic and the catalyst can be any of the metal catalysts or compounds thereof, these catalysts being well-known in the art. The same or different catalyst can be used in those hydrogenation processes where an unsaturated hydrocarbon is converted to a more saturated hydrocarbon. Further details of the hydrogenation processes in which the separated and recovered hydrogen stream of this invention can be used will be omitted in the interest of brevity, since the same will be readily apparent to those skilled in the art upon being acquainted with this invention.

The following example further illustrates the objects and advantages of this invention, but it should be understood that this example is not to be construed to limit unduly this invention.

EXAMPLE

Toluene is heated to 760° F. in heat exchanger 15 and mixed with hydrogen supplied via line 14 at 1400° F., the hydrogen-to-toluene mol ratio being 4:1, the mixture being passed via line 16 to reactor 11, operated at 475 p.s.i.a. with an inlet temperature of 1100° F. and an outlet temperature at 1400° F. The reactor effluent is withdrawn from reactor 11 via line 17 and cooled to 165° F. and a pressure of 460 p.s.i.a. This cooled reactor effluent is then passed to separator 19, from which a gaseous mixture is withdrawn via line 21, cooled, and passed at a temperature of 50° F. and a pressure of 450 p.s.i.a. to benzene absorption tower 23. Pentane at a temperature of 50° F. is passed into the top of absorption tower 23 via line 24, this absorption tower being operated at 450 p.s.i.a. with a kettle temperature of 50° F. and a top temperature of 45° F. The stripped gaseous mixture, comprising hydrogen, methane and pentane, is withdrawn overhead from absorption tower 23 via 27 at 45° F., dried in dryer 28, and passed via line 29 to cooler 31, where it is cooled to −65° F. The refrigerated stream is then mixed with a liquid pentane stream and passed into absorption tower 33, operated at 400 p.s.i.a. The gas stream comprising hydrogen is withdrawn via line 34 from the absorption tower 33 and then passed through cooler 31 and thence recycled via line 36. Liquid from absorption tower 33 is withdrawn via line 41 and passed into flash tower 42, operated at −70° F. and 150 p.s.i.a. The methane-containing gaseous stream withdrawn via line 43 from flash tower 42 is then passed through cooler 31 and disposed of via line 46 as fuel gas. Some of the liquid pentane withdrawn from the bottom of flash tower 42 via line 44 is returned via line 35 to absorption tower 33, and the balance is passed through cooler 31 and thence via line 45 to the benzene absorption zone 23.

The pentane-benzene liquid withdrawn via line 26 from benzene absorption tower 23 is admixed with the benzene liquid withdrawn via line 49 from separator 19 and the mixture passed via line 51 into the benzene stabilizer 52. Overhead, comprising methane and pentane, is withdrawn via line 57 from stabilizer 52, cooled by heat exchanger 58, and then flashed in separator 59, at 100° F. and 150 p.s.i.a. The methane-containing stream 61 withdrawn from separator 59 is then passed to disposal as fuel gas, some of the liquid pentane withdrawn from separator 59 is returned via line 62 as reflux to stabilizer 52, and some returned via line 63 to benzene absorption zone 23. Benzene product is withdrawn via line 53 from stabilizer 52.

A material balance of the process illustrated in the drawing and described in the foregoing example is set forth in Table I.

Table I.—Material balance (mols per stream hour)

| Stream | Toluene Feed | Recycle Toluene | Fresh Hydrogen | Recycle Hydrogen | Reactor Feed | Reactor Effluent | Absorber Feed | Separated Benzene | Absorber Bottoms | Pentane to Benzene Absorber | Absorber Overhead |
|---|---|---|---|---|---|---|---|---|---|---|---|
| Stream Number | 12 | 13 | 38 | 36 | 16 | 17 | 21 | 49 | 26 | 24 | 27 |
| Component: | | | | | | | | | | | |
| Hydrogen | | | 735.4 | 819.6 | 1,555.0 | 897.2 | 895.4 | 1.8 | 2.1 | 0.1 | 893.4 |
| Methane | | | 18.9 | 815.7 | 834.6 | 1,537.0 | 1,525.3 | 11.7 | 29.4 | 9.3 | 1,505.2 |
| Ethane | | | 15.2 | 11.4 | 26.6 | 23.1 | 22.4 | 0.7 | 2.1 | 1.8 | 22.1 |
| Propane | | | 16.8 | | 16.8 | | | | | | |
| Butanes | | | 8.0 | 0.3 | 8.3 | | | | | 1.4 | 1.4 |
| Pentanes | | | 3.1 | 1.3 | 4.4 | | | | | 100.0 | 39.0 |
| $C_7$ cyclics | 1.1 | | | | 1.1 | | | | | | |
| Heptanes | 3.4 | | | | 3.4 | | | | | | |
| $C_8$ cyclics | 1.2 | | | | 1.2 | | | | | | |
| Octanes | 14.3 | | | | 14.3 | | | | | | |
| Benzene | | | | | | 231.5 | 104.4 | 127.1 | 104.4 | | |
| Toluene | 233.4 | 19.9 | | | 253.3 | 25.3 | 7.9 | 17.4 | 7.9 | | |
| Xylenes | 23.8 | 2.1 | | | 25.9 | 2.6 | 0.8 | 1.8 | 0.8 | | |
| $C_9$ aromatics | 1.8 | | | | 1.8 | | | | | | |
| Biphenyl+ | | 7.0 | | | 7.0 | 8.8 | 1.2 | 7.6 | 1.2 | | |
| Totals | 279.0 | 29.0 | 797.4 | 1,648.3 | 2,753.7 | 2,725.5 | 208.9 | 168.1 | 208.9 | 112.6 | 2,461.1 |

| Stream | Pentane to Methane Absorber | Bottoms from Methane Absorber | Flash Overhead | Flash Bottoms | Recycle Pentane | Stabilizer Feed | Stabilized Benzene | Stabilized Fuel Gas | Fuel Gas Product | Recycle Pentane | Pentane Makeup |
|---|---|---|---|---|---|---|---|---|---|---|---|
| Stream Number | 35 | 41 | 43 | 44 | 45 | 51 | 53 | 61 | 46 | 63 | 47 |
| Component: | | | | | | | | | | | |
| Hydrogen | 9.1 | 82.9 | 73.7 | 9.2 | 0.1 | 3.9 | | 3.9 | 77.6 | | |
| Methane | 1,486.4 | 2,175.9 | 682.3 | 1,493.6 | 7.2 | 41.1 | | 39.0 | 721.3 | 2.1 | |
| Ethane | 235.9 | 246.6 | 9.5 | 237.1 | 1.2 | 2.8 | | 2.2 | 11.7 | 0.6 | |
| Propane | | | | | | | | | | | |
| Butanes | 191.3 | 192.4 | 0.2 | 192.2 | 0.9 | | | | 0.2 | | 0.5 |
| Pentanes | 7,597.1 | 7,634.8 | 1.0 | 7,633.8 | 36.7 | 61.0 | | 6.9 | 7.9 | 54.1 | 9.2 |
| $C_7$ cyclics | | | | | | | | | | | |
| Heptanes | | | | | | | | | | | |
| $C_8$ cyclics | | | | | | | | | | | |
| Octanes | | | | | | | | | | | |
| Benzene | | | | | | 231.5 | 231.5 | | | | |
| Toluene | | | | | | 25.3 | 25.3 | | | | |
| Xylenes | | | | | | 2.6 | 2.6 | | | | |
| $C_9$ aromatics | | | | | | | | | | | |
| Biphenyl+ | | | | | | 8.8 | 8.8 | | | | |
| Totals | 9,519.8 | 10,332.6 | 766.7 | 9,565.9 | 46.1 | 377.0 | 268.2 | 52.0 | 818.7 | 56.8 | 9.7 |

Various modifications and alterations of this invention will become apparent to those skilled in the art from the foregoing discussion and accompanying drawing, and it should be understood that this invention is not to be limited unduly to that set forth herein for illustrative purposes.

I claim:

1. A process for recovering hydrogen from a gaseous mixture comprising hydrogen, methane, and a normally liquid hydrogenated hydrocarbon, said process comprising passing a stream of said gaseous mixture into an isothermal absorption zone operated at superatmospheric pressure, passing a stream of a low molecular weight liquid paraffinic hydrocarbon into said absorption zone, withdrawing from the latter a liquid stream of said paraffinic hydrocarbon enriched with said hydrogenated hydrocarbon, withdrawing a gaseous mixture comprising hydrogen, methane, and some of said paraffinic hydrocarbon from said absorption zone and cooling it to subatmospheric temperatures by indirectly heat-exchanging it with coolant in a cooling zone, passing the resulting cooled mixture into a first liquid-vapor separation zone operated at superatmospheric pressure, withdrawing a gaseous stream comprising hydrogen from said separation zone and recycling it to said cooling zone for use as said coolant and thence recovering it as product, withdrawing a liquid stream comprising methane and said paraffinic hydrocarbon from said separation zone and passing it to a second liquid-vapor separation zone operated at a pressure lower than that of said first liquid-vapor separation zone, and withdrawing a gaseous stream comprising methane and a liquid stream comprising said paraffinic hydrocarbon from said second liquid-vapor separation zone and recycling these withdrawn streams to said cooling zone for use as said coolant.

2. The process according to claim 1, wherein said hydrogenated hydrocarbon is selected from the group consisting of benzene and cyclohexane, and said paraffinic hydrocarbon is one having 3 to 6 carbon atoms per molecule.

3. A process for recovery of hydrogen from a gaseous mixture comprising hydrogen, methane, and benzene, said process comprising passing a stream of said gaseous mixture into an isothermal benzene absorption zone operated at superatmospheric pressure, passing a stream of liquid pentane into said benzene absorption zone to contact said gaseous mixture therein, withdrawing from said benzene absorption zone a liquid stream of pentane enriched with benzene, withdrawing a gaseous mixture comprising hydrogen, methane, and some pentane from said benzene absorption zone and cooling it to subatmospheric temperatures by indirectly heat-exchanging it with coolant in a cooling zone, passing the resulting cooled gaseous mixture into a methane absorption zone operated at superatmospheric pressure, withdrawing a gaseous stream comprising hydrogen from said methane absorption zone and recycling it to said cooling zone for use as said coolant and thence recovering it as product, withdrawing a liquid stream comprising methane and pentane from said methane absorption zone and passing it to a flashing zone operated at a superatmospheric pressure lower than that of said methane absorption zone, withdrawing a gas stream from said flashing zone comprising methane and recycling it to said cooling zone for use as said coolant, withdrawing a liquid stream comprising pentane from said flashing zone, passing the bulk of the latter pentane stream into said methane absorption zone, and recycling the balance of said latter pentane stream through said cooling zone and thence to said benzene absorption zone.

4. The process according to claim 3, wherein said liquid stream of pentane enriched with benzene is combined with benzene separated from said gaseous mixture comprising hydrogen, methane and benzene, the resulting combined stream is passed to a benzene stabilization zone, a liquid stream of benzene is recovered as product, a gaseous stream comprising methane and pentane is withdrawn from said benzene stabilization zone, cooled, and passed to a liquid-vapor separator, and a liquid stream comprising pentane is withdrawn from said separation zone and recycled to said benzene absorption zone.

5. In a hydrogenation process wherein an alkyl aromatic is hydrogenated in the presence of hydrogen in a reaction zone, and reaction effluent is separated into a liquid hydrogenated hydrocarbon stream and a gaseous mixture comprising hydrogen, methane, and some of said hydrogenated product, the improvement comprising passing a stream of said gaseous mixture into an isothermal absorption zone operated at superatmospheric pressure, passing a stream of a low molecular weight liquid paraffinic hydrocarbon into said absorption zone to contact said gaseous mixture therein, withdrawing from said absorption zone a liquid stream of said paraffinic hydrocarbon enriched with said hydrogenated hydrocarbon, withdrawing a gaseous mixture comprising hydrogen, methane, and some of said paraffinic hydrocarbon from said absorption zone and cooling it to subatmospheric temperatures by indirectly heat-exchanging it with coolant in a cooling zone, passing the resulting cooled gaseous mixture into a first liquid-vapor separation zone operated at superatmospheric pressure, withdrawing a gaseous stream comprising hydrogen from said separation zone and recycling it to said cooling zone for use as said coolant, recycling said gaseous stream comprising hydrogen from said cooling zone to said reaction zone, withdrawing a liquid stream comprising methane and said paraffinic hydrocarbon from said separation zone and passing it to a second liquid-vapor separation zone operated at a pressure lower than that of said first liquid-vapor separation zone, and withdrawing a gaseous stream comprising methane and a liquid stream comprising said paraffinic hydrocarbon from said second liquid-vapor separation zone and recycling these withdrawn streams to said cooling zone for use as said coolant, combining said liquid hydrogenated stream with said stream comprising paraffinic hydrocarbon enriched with hydrogenated hydrocarbon, passing the resulting combined stream to a stabilizing zone, withdrawing a liquid stream comprising stabilized hydrogenated hydrocarbon from said stabilizing zone, withdrawing a gaseous stream comprising methane and said paraffinic hydrocarbon from said stabilizing zone, cooling it, and passing it to a liquid-vapor separation zone, and withdrawing from the latter zone a liquid stream comprising said paraffinic hydrocarbon and recycling it to said absorption zone.

6. In a hydrodealkylation process wherein toluene is dealkylated in the presence of hydrogen in a hydrodealkylation reaction zone, reaction effluent is separated into a liquid benzene stream and a gaseous mixture comprising hydrogen, methane and some benzene, the improvement comprising passing a stream of said gaseous mixture into an isothermal benzene absorption zone operated at superatmospheric pressure, passing a stream of liquid pentane into said benzene absorption zone to contact said gaseous mixture therein, withdrawing from said benzene absorption zone a liquid stream of pentane enriched with benzene, withdrawing a gaseous mixture comprising hydrogen, methane, and some pentane from said benzene absorption zone and cooling it to subatmospheric temperatures by indirectly heat-exchanging it with coolant in a cooling zone, passing the resulting cooled gaseous mixture into a methane absorption zone operated at superatmospheric pressure, withdrawing a gaseous stream comprising hydrogen from said methane absorption zone and recycling it to said cooling zone for use as said coolant and thence recycling it to said hydrodealkylation reaction zone, withdrawing a liquid stream comprising methane and pentane from said methane absorption zone and passing it to a flashing zone operated at a superatmospheric pressure lower than that of said methane absorption zone, withdrawing a gas stream from said flashing zone comprising methane and recycling it to said cooling zone for use as said coolant, withdrawing a liquid stream comprising pentane from said flashing zone, passing the bulk of the latter pentane stream into said methane absorption zone, and recycling the balance of said latter pentane stream through said cooling zone and thence to said benzene absorption zone, combining said liquid benzene stream with said liquid stream of pentane enriched with benzene, passing the resulting combined stream to a benzene stabilization zone, withdrawing a liquid stream of stabilized benzene from said stabilization zone, withdrawing a gaseous mixture comprising methane and pentane from said stabilization zone, cooling it, and passing it to a liquid-vapor separation zone, and withdrawing from the latter a liquid stream comprising pentane and recycling it to said benzene absorption zone.

References Cited by the Examiner
UNITED STATES PATENTS

| 1,913,805 | 6/33 | Hausen | 62—23 |
| 2,775,103 | 12/56 | Koble et al. | 62—17 |
| 2,795,629 | 6/57 | Boedeker | 260—672 |
| 2,951,886 | 9/60 | Pausen | 260—672 |

ALPHONSO D. SULLIVAN, *Primary Examiner.*

JOSEPH R. LIBERMAN, *Examiner.*